US011498055B2

(12) United States Patent
Quinet et al.

(10) Patent No.: US 11,498,055 B2
(45) Date of Patent: Nov. 15, 2022

(54) SCR CATALYST (71) Applicant: Umicore AG & Co. KG, Hanau-Wolfgang (DE)

(72) Inventors: Elodie Quinet, Hanau (DE); Stephan Malmberg, Frankfurt (DE); Nicola Soeger, Nidderau (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 17/405,231

(22) Filed: Aug. 18, 2021

(65) Prior Publication Data
US 2021/0402376 A1 Dec. 30, 2021

Related U.S. Application Data (63) Continuation of application No. 16/763,622, filed as application No. PCT/EP2018/081072 on Nov. 13, 2018, now Pat. No. 11,135,571.

(30) Foreign Application Priority Data

Nov. 14, 2017 (EP) ..................................... 17201483

(51) Int. Cl.
*B01J 23/00* (2006.01)
*B01J 23/30* (2006.01)
*F01N 3/021* (2006.01)
*F01N 3/08* (2006.01)
*F01N 3/10* (2006.01)
*F01N 3/20* (2006.01)
*F01N 3/28* (2006.01)

(52) U.S. Cl.
CPC ............. *B01J 23/30* (2013.01); *B01J 23/002* (2013.01); *F01N 3/021* (2013.01); *F01N 3/0842* (2013.01); *F01N 3/103* (2013.01); *F01N 3/2066* (2013.01); *F01N 3/28* (2013.01); *F01N 2370/02* (2013.01); *F01N 2610/02* (2013.01)

(58) Field of Classification Search
CPC .... B01D 2255/2065; B01D 2255/2098; B01D 2255/40; B01D 2255/20707; B01D 2255/20723; B01D 2258/012; B01D 2251/2067; B01D 2255/20776; B01D 53/9418; B01D 2255/30; B01J 21/08; B01J 37/08; B01J 2523/00; B01J 37/031; B01J 37/0036; B01J 37/04; B01J 23/002; B01J 37/12; B01J 37/088; B01J 23/30; B01J 2523/3712; B01J 2523/47; B01J 2523/53; B01J 2523/55; B01J 2523/69; B01J 2523/822; F01N 2610/02; F01N 2370/02; F01N 3/035; F01N 3/103; F01N 3/0842; F01N 3/28; F01N 3/106; F01N 3/2066; F01N 3/021; F01N 3/2882; Y02T 10/12
See application file for complete search history.

(56) References Cited

U.S. PATENT DOCUMENTS

| 4,378,338 | A | 3/1983 | Imanari | |
|---|---|---|---|---|
| 5,723,404 | A * | 3/1998 | Butje | ................. B01D 53/8628 423/239.1 |
| 8,975,206 | B2 | 3/2015 | Schermanz | |
| 9,555,371 | B2 | 1/2017 | Fisher | |
| 10,022,704 | B2 * | 7/2018 | Malmberg | ......... B01D 53/9418 |
| 2009/0060810 | A1 | 3/2009 | Hong | |
| 2012/0308459 | A1 | 12/2012 | Guo | |
| 2013/0210617 | A1 | 8/2013 | Hernandez | |
| 2014/0100106 | A1 | 4/2014 | Ha | |
| 2016/0288094 | A1 | 10/2016 | Malmberg | |
| 2017/0043325 | A1 | 2/2017 | Cheon | |
| 2018/0195428 | A1 | 7/2018 | Johansen | |

FOREIGN PATENT DOCUMENTS

| CN | 103706351 | | 4/2014 | |
|---|---|---|---|---|
| CN | 105636690 | | 6/2016 | |
| CN | 106215929 | A | 12/2016 | |
| CN | 106423139 | | 2/2017 | |
| CN | 106861675 | | 6/2017 | |
| CN | 107073444 | | 8/2017 | |
| DE | 4314896 | A1 | 11/1993 | |
| DE | 112007000814 | | 2/2009 | |
| EP | 0345695 | A2 | 12/1989 | |
| EP | 2700447 | A1 | 2/2014 | |
| EP | 2716364 | A1 | 4/2014 | |
| EP | 2875863 | A1 | 5/2015 | |
| JP | 2004290753 | A | 10/2004 | |
| JP | 2006212591 | | 8/2006 | |
| JP | 2018529039 | | 10/2018 | |
| RU | 2 730 513 | C2 * | 8/2020 | ............. B01J 37/04 |
| WO | 1989003366 | A1 | 4/1989 | |
| WO | 2011013006 | A2 | 2/2011 | |

(Continued)

OTHER PUBLICATIONS

International Search Report received in PCT/EP2018/081072, dated Dec. 19, 2018.
Written Opinion received in PCT/EP2018/081072, dated Dec. 19, 2018.
Jansson, Jonas, "Ch. 3, Vanadia-Based Catalysts for Mobile SCR", "Urea-SCR Technology for deNOx After Treatment of Diesel Exhausts, Fundamental and Applied Catalysis", 2014, Publisher Nova and E. Tronconi (eds.), Springer Science+Business Media.
Mayer, Thorsten, "Feststoff-SCR-System auf Basis von Ammoniumcarbamat", Nov. 22, 2005, Publisher Universitt Kaiserslautern.

(Continued)

*Primary Examiner* — Timothy C Vanoy
(74) *Attorney, Agent, or Firm* — Suzannah K. Sundby, Esq.; Canady + Lortz LLP (57) ABSTRACT The present invention relates to a catalyst comprising at least one oxide of vanadium, at least one oxide of tungsten, at least one oxide of cerium, at least one oxide of titanium and at least one oxide of antimony, and an exhaust system containing said oxides.

14 Claims, 7 Drawing Sheets (56) References Cited

FOREIGN PATENT DOCUMENTS

| | | |
|---|---|---|
| WO | 2011032020 A2 | 3/2011 |
| WO | 2012004263 A1 | 1/2012 |
| WO | 2017005778 | 1/2017 |
| WO | 2017101449 A1 | 6/2017 |

OTHER PUBLICATIONS

Office Action received in IN 202047020174, dated Nov. 23, 2021.
Office Action received in CN 201880074011 dated Sep. 14, 2022.
Office Action received in JP 2020526412 dated Sep. 5, 2022.
Search Report received in JP 2020526412 dated Aug. 24, 2022.

\* cited by examiner

SCR CATALYST

The present invention relates to an SCR catalyst, based upon vanadium oxide, which contains antimony oxide and cerium oxide.

The exhaust gas of motor vehicles that are operated with lean-burn combustion engines, such as diesel engines, also contains, in addition to carbon monoxide (CO) and nitrogen oxides ($NO_x$), components that result from the incomplete combustion of the fuel in the combustion chamber of the cylinder. In addition to residual hydrocarbons (HC), which are usually also predominantly present in gaseous form, these also include particle emissions. These are complex agglomerates from predominantly carbonaceous particulate matter and an adhering liquid phase, which usually preponderantly consists of longer-chained hydrocarbon condensates. The liquid phase adhering to the solid components is also referred to as "Soluble Organic Fraction SOF" or "Volatile Organic Fraction VOF."

To clean such exhaust gases, the aforementioned components must be converted to harmless compounds as completely as possible, which is only possible by using suitable catalysts.

A well-known process for removing nitrogen oxides from exhaust gases in the presence of oxygen is selective catalytic reduction using ammonia on a suitable catalyst (SCR process). With this process, the nitrogen oxides to be removed from the exhaust gas are converted into nitrogen and water using ammonia as a reducing agent.

The so-called "standard SCR reaction" according to equation (I)

$$NH_3 + NO + 1/4\ O_2 \rightarrow N_2 + 3/2\ H_2O \quad (I)$$

as well as the so-called "fast SCR reaction" according to equation (II)

$$NH_3 + 1/2\ NO + 1/2\ NO_2 \rightarrow N_2 + 3/2\ H_2O \quad (II)$$

were identified as significant reaction pathways of the SCR reaction.

Since the exhaust gas from lean-burn internal combustion engines usually comprises $NO_2$ only in amounts of approximately 10% of the total proportion of nitrogen oxide, it is normally desired to increase its amount in order to benefit from the fast SCR reaction. This is done, for example, by means of an upstream oxidation catalytic converter. However, depending upon the exhaust system used in the specific case, an SCR catalytic converter may nevertheless be confronted with quite different $NO_2/NOx$ ratios, which may range from an excess of NO to an excess of $NO_2$.

The ammonia used as reducing agent can be made available by dosing an ammonia precursor compound, such as urea, ammonium carbamate, or ammonium formate, into the exhaust tract, and subsequent hydrolysis.

So-called mixed oxide catalysts, which are based upon oxides of vanadium and which generally also contain oxides of titanium and of further metals, e.g. of tungsten (see Isabella Nova and Enrico Tronconi (eds.), Urea-SCR Technology for deNOx After Treatment of Diesel Exhausts, Chapter 3, Springer Verlag, 2014) may also be used as SCR catalysts If the nitrogen oxide contained in the exhaust gas is present or at least predominantly present in the form of NO, SCR catalysts based upon vanadium oxide are characterized by good activity and stability. However, in the case of $NO_2$ excess, they show a clear loss in activity. Although the addition of cerium oxide to the vanadium oxide-based SCR catalysts improves activity in case of $NO_2$ excess, it also impairs the low-temperature activity (T<250° C.) in cases of NO excess.

Accordingly, there is a need for vanadium oxide-based SCR catalysts which have both good activity in cases of $NO_2$ and NO excess and low temperatures (T<250° C.). Furthermore, there is also a need to improve the thermal stability of vanadium-based SCR catalysts.

It is already known to also use antimony oxide in SCR catalysts that are based upon me. Thus, for example, U.S. Pat. No. 9,662,610 discloses a process for reducing nitrogen oxides by means of a catalyst comprising titanium dioxide, vanadium compounds, and antimony compounds. WO 2017/101449 A1 discloses the use of a catalyst composition containing titanium dioxide, a composite oxide containing vanadium and antimony, and, optionally, oxides of silicon, vanadium, and antimony.

CN106215929 discloses a cerium antimony composite oxide which is used as a denitrification catalyst.

Finally, U.S. Pat. No. 8,975,206 discloses a catalyst composition which can also contain antimony in addition to vanadium and titanium.

It has now surprisingly been found that, starting from vanadium oxide-based SCR catalysts containing cerium oxide, the above-mentioned technical problem can be solved by adding an oxide of antimony to the catalyst.

The present invention thus relates to a catalyst containing
- at least one oxide of vanadium in an amount of 2 to 6 wt %,
- at least one oxide of tungsten in an amount of 0.5 to 2 wt %,
- at least one oxide of cerium in an amount of 2 to 4 wt %,
- at least one oxide of antimony in an amount of 1 to 7 wt %, and
- at least one oxide of titanium in an amount measured so as to result in a total of 100 wt %, in each case based on the total weight of the catalyst and calculated as $V_2O_5$, $WO_3$, $CeO_2$, $Sb_2O_5$, or $TiO_2$.

The at least one oxide of titanium acts as carrier material, the at least one oxide of vanadium as active catalyst component, and the at least one of the oxides of tungsten, cerium, and antimony as promoters. Promoters are understood to mean substances which maintain or increase the activity of a catalyst.

In one embodiment of the catalyst according to the invention, it additionally contains at least one oxide of silicon.

In further embodiments of the catalyst according to the invention, it additionally contains at least one oxide of molybdenum, niobium, zirconium, tantalum, and/or hafnium.

In preferred embodiments of the catalyst according to the invention, it contains at least one oxide of cerium in an amount of 2 to 4 wt %, relative to the weight of the catalyst and calculated as $CeO_2$. In further preferred embodiments of the catalyst according to the invention, it contains at least one oxide of antimony in an amount of 1 to 7 wt %, relative to the weight of the catalyst and calculated as $Sb_2O_5$. In addition, preference is given to embodiments of the catalyst according to the invention which contain at least one oxide of cerium in an amount of 2 to 4 wt % and calculated as $CeO_2$, and at least one oxide of antimony in an amount of 1 to 7 wt %, in each case based on the weight of the catalyst and calculated as $Sb_2O_5$.

In further preferred embodiments of the catalyst according to the invention, it contains at least one oxide of vanadium in an amount of 2 to 6 wt %, at least one oxide of tungsten in an amount of 0.5 to 2 wt %, at least one oxide of cerium in an amount of 2 to 4 wt %, at least one oxide of antimony in an amount of 1 to 7 wt %, and at least one oxide of titanium in an amount measured so as to result in a total of 100 wt %, in each case based on the total weight of the catalyst and calculated as $V_2O_5$, $WO_3$, $CeO_2$, or $Sb_2O_5$.

If the catalyst according to the invention contains at least one oxide of silicon, it is preferably present in quantities of 2 to 7 wt %, relative to the weight of the catalyst and calculated as $SiO_2$. If the catalyst according to the invention comprises at least one oxide of molybdenum, niobium, zirconium, tantalum, and/or hafnium, then the total quantity of these oxides is preferably 0.5 to 20 wt %, relative to the weight of the catalyst and calculated as $MoO_3$, $Nb_2O_5$, $ZrO_2$, $Ta_2O_5$, or $HfO_2$.

The catalyst according to the invention is preferably free of magnesium or compounds of magnesium.

In further embodiments, the catalyst according to the invention is also free of zirconium or compounds of zirconium.

Within the context of the present invention, the term oxide of vanadium comprises all oxides which arise or can be present under the conditions of the preparation, storage, and use of the catalyst according to the invention. It thus comprises, for example, $V_2O_5$, but also all other oxides of vanadium.

Analogously, the term oxide of tungsten comprises $WO_3$, for example, but also all other oxides of tungsten, the term oxide of cerium comprises $CeO_2$, for example, but also all other oxides of cerium, the term oxide of antimony comprises $Sb_2O_5$, for example, but also all other oxides of antimony, the term oxide of titanium comprises $TiO_2$, for example, but also all other oxides of titanium, and oxide of silicon comprises $SiO_2$, for example, but also all other oxides of silicon. The same also applies to the terms oxide of molybdenum, niobium, zirconium, tantalum, or hafnium.

The catalyst according to the invention can be produced in a simple manner.

Thus, for example, oxides of vanadium, tungsten, cerium, antimony, and titanium, and, optionally, the further metal oxides in powder form, can be thoroughly mixed in the desired amounts and then calcined. However, it is generally advantageous for the oxides mentioned to be slurried in water and then dried and calcined.

In one variant of this process, only a portion of the metal oxides are provided as such, while the remaining metals are added in the form of water-soluble metal salts. For example, oxides of tungsten, cerium, antimony, and titanium can be provided and then impregnated with the aqueous solution of a water-soluble vanadium compound and subsequently dried and calcined. Suitable water-soluble vanadium compounds are, in particular, vanadyloxalate, which can be obtained by dissolving vanadium pentoxide in oxalic acid (see, for example, EP 0 345 695 A2), or reaction products of vanadium pentoxide with amines or ethanolamines (see, for example, WO 89/03366 A1 and WO 2011/013006)—especially, ammonium metavanadate. DE 11 2007 000 814 T5 also describes the use of vanadium oxytrichloride.

Alternatively, oxides of vanadium, cerium, antimony, and titanium can also be provided, and then impregnated with the aqueous solution of a water-soluble tungsten compound and subsequently dried and calcined. A suitable water-soluble tungsten compound for this purpose is ammonium metatungstate.

Instead of the individual oxides, two or more metal oxides can also be used in the form of the corresponding mixed oxides or in the form of metal oxides doped with one or more other metal oxides. For example, a titanium dioxide doped with silicon dioxide and tungsten trioxide may be impregnated with water-soluble compounds of vanadium and antimony, and then dried and calcined.

Depending in particular, depending upon the production method, the catalyst according to the invention can be present as a mixture of metal oxides, as mixed oxide, but, in particular, in the form of intermediates between mixture of metal oxides and mixed oxide. For example, two or three metals may be present in the form of a mixed oxide impregnated with the remaining metals.

The starting compounds required for preparing the catalyst according to the invention, such as metal oxides, mixed oxides, or water-soluble metal salts, are known to the person skilled in the art and are commercially available.

In preferred embodiments, the catalyst according to the invention is present as a coating on a carrier body, which can be present as a flow-through honeycomb body or wall flow filter.

In embodiments of the present invention, the carrier body is catalytically inert and consists of ceramic or metallic material—for example, silicon carbide, aluminum titanate, or cordierite. In these embodiments, all components of the catalyst according to the invention are present in one coating.

Coated carrier bodies can be produced according to methods familiar to the person skilled in the art, e.g., according to common dip coating methods or pump and suction coating methods with subsequent thermal post-treatment (calcination).

In another embodiment of the present invention, the catalyst according to the invention itself is a component of the carrier body, which in this case is formed from the catalyst according to the invention and a matrix component.

Carrier bodies, flow-through substrates, and wall flow substrates that do not consist only of inert material, such as cordierite, but additionally contain a catalytically-active material, are known to the person skilled in the art. To produce them, a mixture consisting of, for example, 10 to 95 wt % of an inert matrix component and 5 to 90 wt % of catalytically-active material is extruded according to a method known per se. All of the inert materials that are also otherwise used to produce catalyst substrates can be used as matrix components in this case. These are, for example, silicates, oxides, nitrides, or carbides, wherein, in particular, magnesium aluminum silicates are preferred.

The catalyst according to the invention is particularly well suited to the reduction of nitrogen oxides in exhaust gases of lean-burn internal combustion engines—in particular, diesel engines.

The present invention, therefore, also relates to a method for the reduction of nitrogen oxides in exhaust gases of lean-burn internal combustion engines, comprising the following method steps:

adding a reducing agent to the exhaust-gas-containing nitrogen oxides, and passing the resulting mixture from the exhaust-gas-containing nitrogen oxides and reducing agent over a catalyst according to the invention.

As a reducing agent, ammonia comes especially into consideration, whereby, with particular advantage, not ammonia itself, but an ammonia precursor—in particular, urea—is added to the nitrogen-oxide-containing exhaust gas.

In particular, the catalyst according to the invention is used as a component of an exhaust gas cleaning system which, for example, comprises an oxidation catalyst and a diesel particle filter arranged on the inflow side, in addition to the catalyst according to the invention. In so doing, the catalyst according to the invention can also be present as a coating on the diesel particle filter.

The present invention therefore also relates to an exhaust gas purification system for the treatment of diesel exhaust gas, comprising, in the flow direction of the exhaust gas,
an oxidation catalyst,
a diesel particle filter, and
a catalyst according to the invention,
or
an oxidation catalyst and
a diesel particle filter on which a catalyst according to the invention is present as a coating.

Oxidation catalysts suitable for the exhaust gas purification system according to the invention—in particular, platinum, palladium, or platinum and palladium supported on, for example, aluminum oxide—and diesel particle filters are known to the person skilled in the art and are commercially available.

The exhaust gas purification system according to the invention generally comprises a device for metering in the reducing agent arranged upstream of the catalyst according to the invention. The injection device can be chosen at will by the person skilled in the art, wherein suitable devices can be taken from the literature (see, for example, T. Mayer, Feststoff-SCR-System auf Basis von Ammonium-carbamat, Dissertation, Technical University of Kaiserslautern, 2005). The reducing agent introduced into the exhaust gas stream via the injection device may be, in particular, ammonia as such or in the form of a compound from which ammonia is formed under the ambient conditions. Examples of suitable compounds are aqueous solutions of urea or ammonium formate, as well as solid ammonium carbamate. As a rule, the reducing agent or a precursor thereof is kept in stock in a container that is carried along with and connected to the injection device.

The invention is explained below in more detail by means of figures and examples. The following are shown.

EXAMPLE 1 a) A commercially available titanium dioxide in the anatase form doped with 5 wt % silicon dioxide was dispersed in water, and then vanadium dioxide ($VO_2$), tungsten trioxide ($WO_3$), cerium dioxide ($CeO_2$), and antimony pentoxide ($Sb_2O_5$) were added in amounts so as to result in a catalyst of the composition 86.00 wt % $TiO_2$, 4.50 wt % $SiO_2$, 3.75 wt % $V_2O_5$, 1.00 wt % $WO_3$, 2.00 wt % $CeO_2$, and 2.75 wt % $Sb_2O_5$ resulted. The slurry was vigorously stirred and then milled in a commercially available agitator bead mill.

b) The dispersion obtained according to a) was coated in a conventional manner onto a commercially available ceramic flow substrate with a volume of 0.5 L and a cell number of 62 cells per square centimeter with a wall thickness of 0.17 mm over its entire length, with a washcoat loading of 360 g/L. The powder thus obtained was dried at 90° C. and then calcined at 600° C. for 2 hours. The catalyst K1 thus obtained is present in the fresh state and is therefore referred to hereinafter as K1f.

c) The catalyst K1 obtained according to b) was subjected to hydrothermal aging for 48 hours at 700° C. in a gas atmosphere (10% $O_2$, 10% $H_2O$, remainder $N_2$). The catalyst K1 is then present in the aged state and is referred to hereinafter as K1a.

COMPARATIVE EXAMPLE 1 a) A commercially available titanium dioxide in the anatase form doped with 5 wt % silicon dioxide was dispersed in water, and then vanadium dioxide ($VO_2$) and tungsten trioxide ($WO_3$) were added in amounts so as to result in a catalyst of the composition 90.5 wt % $TiO_2$, 4.75 wt % $SiO_2$, 3.75 wt % $V_2O_5$, 1.00 wt % $WO_3$ resulted. The slurry was vigorously stirred and then milled in a commercially available agitator bead mill.

b) The dispersion obtained according to a) was coated in a conventional manner onto a commercially available ceramic flow substrate with a volume of 0.5 L and a cell number of 62 cells per square centimeter with a wall thickness of 0.17 mm over its entire length, with a washcoat loading of 360 g/L. The powder thus obtained was dried at 90° C. and then calcined at 600° C. for 2 hours. The catalyst VK1 thus obtained is in the fresh state and is therefore referred to hereinafter as VK1f.

c) The VK1a obtained according to b) was subjected to hydrothermal aging for 48 hours at 700° C. in a gas atmosphere (10% $O_2$, 10% $H_2O$, remainder $N_2$). The catalyst VK1 is then in the aged state and is referred to hereinafter as VK1a.

COMPARATIVE EXAMPLE 2 a) A commercially available titanium dioxide doped with 5 wt % silicon dioxide in the anatase form was dispersed in water, and then vanadium dioxide ($VO_2$), tungsten trioxide ($WO_3$), and cerium dioxide ($CeO_2$) were added in amounts so as to result in a catalyst of the composition 88.60 wt % $TiO_2$, 4.65 wt % $SiO_2$, 3.75 wt % $V_2O_5$, 1.00 wt % $WO_3$, and 2.00 wt % $CeO_2$ resulted. The slurry was vigorously stirred and then milled in a commercially available agitator bead mill.

b) The dispersion obtained according to a) was coated in a conventional manner onto a commercially available ceramic flow substrate with a volume of 0.5 L and a cell number of 62 cells per square centimeter with a wall thickness of 0.17 mm over its entire length, with a washcoat loading of 360 g/L. The powder thus obtained was dried at 90° C. and then calcined at 600° C. for 2 hours. The catalyst VK2 thus obtained is present in the fresh state and is therefore referred to hereinafter as VK2f.

c) The VK2a obtained according to b) was subjected to hydrothermal aging for 48 hours at 700° C. in a gas atmosphere (10% $O_2$, 10% $H_2O$, remainder $N_2$). The catalyst VK2 is then in the aged state and is referred to hereinafter as VK2a.

COMPARATIVE EXAMPLE 3 a) A commercially available titanium dioxide in the anatase form doped with 5 wt % silicon dioxide was dispersed in water, and then vanadium dioxide ($VO_2$), tungsten trioxide ($WO_3$), and antimony pentoxide were added in amounts so as to result in a catalyst of the composition 87.9 wt % $TiO_2$, 4.60 wt % $SiO_2$, 3.75 wt % $V_2O_5$, 1.00 wt % $WO_3$, and 2.75 wt % $Sb_2O_5$ resulted. The slurry was vigorously stirred and then milled in a commercially available agitator bead mill.

b) The dispersion obtained according to a) was coated in a conventional manner onto a commercially available ceramic flow substrate with a volume of 0.5 L and a cell number of 62 cells per square centimeter with a wall thickness of 0.17 mm over its entire length, with a washcoat loading of 360 g/L. The powder thus obtained was dried at 90° C. and then calcined at 600° C. for 2 hours. The catalyst VK3 thus obtained is in the fresh state and is therefore referred to hereinafter as VK3f.

c) The VK3a obtained according to b) was subjected to hydrothermal aging for 48 hours at 700° C. in a gas atmosphere (10% $O_2$, 10% $H_2O$, remainder $N_2$). The catalyst VK3 is then in the aged state and is referred to hereinafter as VK3a.

COMPARATIVE EXAMPLE 4 a) A commercially available titanium dioxide in the anatase form doped with 5 wt % silicon dioxide was dispersed in water, and then vanadium dioxide ($VO_2$), tungsten trioxide ($WO_3$), and antimony pentoxide were added in amounts so as to result in a catalyst of the composition 86.9 wt % $TiO_2$, 4.60 wt % $SiO_2$, 3.75 wt % $V_2O_5$, 2.00 wt % $CeO_2$, and 2.75 wt % $Sb_2O_5$ resulted. The slurry was vigorously stirred and then milled in a commercially available agitator bead mill.

b) The dispersion obtained according to a) was coated in a conventional manner onto a commercially available ceramic flow substrate with a volume of 0.5 L and a cell number of 62 cells per square centimeter with a wall thickness of 0.17 mm over its entire length, with a washcoat loading of 360 g/L. The powder thus obtained was dried at 90° C. and then calcined at 600° C. for 2 hours. The catalyst VK4 thus obtained is in the fresh state and is therefore referred to hereinafter as VK4f.

c) The VK4a obtained according to b) was subjected to hydrothermal aging for 48 hours at 700° C. in a gas atmosphere (10% $O_2$, 10% $H_2O$, remainder $N_2$). The catalyst VK4 is then in the aged state and is referred to hereinafter as VK4a.

COMPARATIVE EXAMPLE 5 a) A commercially available titanium dioxide in the anatase form was dispersed in water, and then vanadium dioxide ($VO_2$), tungsten trioxide ($WO_3$), cerium dioxide ($CeO_2$), and antimony pentoxide ($Sb_2O_5$) were added in amounts so as to result in a catalyst of the composition 90.5 wt % $TiO_2$, 3.75 wt % $V_2O_5$, 1.00 wt % $WO_3$, 2.00 wt % $CeO_2$, and 2.75 wt % $Sb_2O_5$ resulted. The slurry was vigorously stirred and then milled in a commercially available agitator bead mill.

b) The dispersion obtained according to a) was coated in a conventional manner onto a commercially available ceramic flow substrate with a volume of 0.5 L and a cell number of 62 cells per square centimeter with a wall thickness of 0.17 mm over its entire length, with a washcoat loading of 360 g/L. The powder thus obtained was dried at 90° C. and then calcined at 600° C. for 2 hours. The catalyst VK5 thus obtained is in the fresh state and is therefore referred to hereinafter as VK5f.

c) The VK5a obtained according to b) was subjected to hydrothermal aging for 48 hours at 700° C. in a gas atmosphere (10% $O_2$, 10% $H_2O$, remainder $N_2$). The catalyst VK5 is then in the aged state and is referred to hereinafter as VK5a.

COMPARATIVE EXAMPLE 6 a) A commercially available titanium dioxide in the anatase form doped with 5 wt % silicon dioxide was dispersed in water, and then vanadium dioxide ($VO_2$), tungsten trioxide ($WO_3$), cerium dioxide ($CeO_2$), and antimony pentoxide ($Sb_2O_5$) were added in amounts so as to result in a catalyst of the composition 86.45 wt % $TiO_2$, 4.55 wt % $SiO_2$, 3.75 wt % $V_2O_5$, 0.50 wt % $WO_3$, 2.00 wt % $CeO_2$, and 2.75 wt % $Sb_2O_5$ resulted. The slurry was vigorously stirred and then milled in a commercially available agitator bead mill.

b) The dispersion obtained according to a) was coated in a conventional manner onto a commercially available ceramic flow substrate with a volume of 0.5 L and a cell number of 62 cells per square centimeter with a wall thickness of 0.17 mm over its entire length, with a washcoat loading of 360 g/L. The powder thus obtained was dried at 90° C. and then calcined at 600° C. for 2 hours. The catalyst VK6 thus obtained is in the fresh state and is therefore referred to hereinafter as VK6f.

c) The VK6a obtained according to b) was subjected to hydrothermal aging for 48 hours at 700° C. in a gas atmosphere (10% $O_2$, 10% $H_2O$, remainder $N_2$). The catalyst VK6 is then in the aged state and is referred to hereinafter as VK6a.

COMPARATIVE EXAMPLE 7 a) A commercially available titanium dioxide in the anatase form doped with 5 wt % silicon dioxide was dispersed in water, and then vanadium dioxide (VO$_2$), tungsten trioxide (WO$_3$), cerium dioxide (CeO$_2$), and antimony pentoxide (Sb$_2$O$_5$) were added in in amounts so as to result in a catalyst of the composition 85.03 wt % TiO$_2$, 4.47 wt % SiO$_2$, 3.75 wt % V$_2$O$_5$, 2.00 wt % WO$_3$, 2.00 wt % CeO$_2$ and 2.75 wt % Sb$_2$O$_5$ resulted. The slurry was vigorously stirred and then milled in a commercially available agitator bead mill.

b) The dispersion obtained according to a) was coated in a conventional manner onto a commercially available ceramic flow substrate with a volume of 0.5 L and a cell number of 62 cells per square centimeter with a wall thickness of 0.17 mm over its entire length, with a washcoat loading of 360 g/L. The powder thus obtained was dried at 90° C. and then calcined at 600° C. for 2 hours. The catalyst VK7 thus obtained is in the fresh state and is therefore referred to hereinafter as VK7f.

c) The VK7a obtained according to b) was subjected to hydrothermal aging for 48 hours at 700° C. in a gas atmosphere (10% O$_2$, 10% H$_2$O, remainder N$_2$). The catalyst VK7 is then in the aged state and is referred to hereinafter as VK7a.

COMPARATIVE EXAMPLE 8 a) A commercially available titanium dioxide in the anatase form doped with 5 wt % silicon dioxide was dispersed in water, and then vanadium dioxide (VO$_2$), tungsten trioxide (WO$_3$), cerium dioxide (CeO$_2$), and antimony pentoxide (Sb$_2$O$_5$) were added in amounts so as to result in a catalyst of the composition 84.07 wt % TiO$_2$, 4.43 wt % SiO$_2$, 3.75 wt % V$_2$O$_5$, 1.00 wt % WO$_3$, 4.00 wt % CeO$_2$, and 2.75 wt % Sb$_2$O$_5$ resulted. The slurry was vigorously stirred and then milled in a commercially available agitator bead mill.

b) The dispersion obtained according to a) was coated in a conventional manner onto a commercially available ceramic flow substrate with a volume of 0.5 L and a cell number of 62 cells per square centimeter with a wall thickness of 0.17 mm over its entire length, with a washcoat loading of 360 g/L. The powder thus obtained was dried at 90° C. and then calcined at 600° C. for 2 hours. The catalyst VK8 thus obtained is in the fresh state and is therefore referred to hereinafter as VK8f.

c) The VK8a obtained according to b) was subjected to hydrothermal aging for 48 hours at 700° C. in a gas atmosphere (10% O$_2$, 10% H$_2$O, remainder N$_2$). The catalyst VK8 is then in the aged state and is referred to hereinafter as VK8a.

COMPARATIVE EXAMPLE 9 a) A commercially available titanium dioxide in the anatase form doped with 5 wt % silicon dioxide was dispersed in water, and then vanadium dioxide (VO$_2$), tungsten trioxide (WO$_3$), cerium dioxide (CeO$_2$), and antimony pentoxide (Sb$_2$O$_5$) were added in amounts so as to result in a catalyst of the composition 84.79 wt % TiO$_2$, 4.46 wt % SiO$_2$, 3.75 wt % V$_2$O$_5$, 1.00 wt % WO$_3$, 2.00 wt % CeO$_2$, and 4.00 wt % Sb$_2$O$_5$ resulted. The slurry was vigorously stirred and then milled in a commercially available agitator bead mill.

b) The dispersion obtained according to a) was coated in a conventional manner onto a commercially available ceramic flow substrate with a volume of 0.5 L and a cell number of 62 cells per square centimeter with a wall thickness of 0.17 mm over its entire length, with a washcoat loading of 360 g/L. The powder thus obtained was dried at 90° C. and then calcined at 600° C. for 2 hours. The catalyst VK9 thus obtained is in the fresh state and is therefore referred to hereinafter as VK9f.

c) The VK9a obtained according to b) was subjected to hydrothermal aging for 48 hours at 700° C. in a gas atmosphere (10% O$_2$, 10% H$_2$O, remainder N$_2$). The catalyst VK9 is then in the aged state and is referred to hereinafter as VK9a.

COMPARATIVE EXAMPLE 10 a) A commercially available titanium dioxide in the anatase form doped with 5 wt % silicon dioxide was dispersed in water, and then vanadium dioxide (VO$_2$), tungsten trioxide (WO$_3$), cerium dioxide (CeO$_2$), and antimony pentoxide (Sb$_2$O$_5$) were added in amounts so as to result in a catalyst of the composition 81.94 wt % TiO$_2$, 4.31 wt % SiO$_2$, 3.75 wt % V$_2$O$_5$, 1.00 wt % WO$_3$, 2.00 wt % CeO$_2$, and 7.00 wt % Sb$_2$O$_5$ resulted. The slurry was vigorously stirred and then milled in a commercially available agitator bead mill.

b) The dispersion obtained according to a) was coated in a conventional manner onto a commercially available ceramic flow substrate with a volume of 0.5 L and a cell number of 62 cells per square centimeter with a wall thickness of 0.17 mm over its entire length, with a washcoat loading of 360 g/L. The powder thus obtained was dried at 90° C. and then calcined at 600° C. for 2 hours. The catalyst VK10 thus obtained is in the fresh state and is therefore referred to hereinafter as VK10f.

c) The VK10a obtained according to b) was subjected to hydrothermal aging for 48 hours at 700° C. in a gas atmosphere (10% O$_2$, 10% H$_2$O, remainder N$_2$). The catalyst VK10 is then in the aged state and is referred to hereinafter as VK10a.

Table 1 summarizes the compositions of the catalysts of the examples mentioned. The composition of the catalyst according to the invention is not limited to explicitly shown examples.

TABLE 1

Compositions of the Catalysts of the Examples

| Example | V$_2$O$_5$ (wt %) | WO$_3$ (wt %) | CeO$_2$ (wt %) | Sb$_2$O$_5$ (wt %) | SiO$_2$ (wt %) | TiO$_2$ (wt %) |
|---|---|---|---|---|---|---|
| K1 | 3.75 | 1.00 | 2.00 | 2.75 | 4.50 | 86.00 |
| VK1 | 3.75 | 1.00 | | | 4.75 | 90.50 |
| VK2 | 3.75 | 1.00 | 2.00 | | 4.65 | 88.60 |
| VK3 | 3.75 | 1.00 | | 2.75 | 4.60 | 87.90 |
| VK4 | 3.75 | | 2.00 | 2.75 | 4.60 | 86.90 |
| VK5 | 3.75 | 1.00 | 2.00 | 2.75 | | 90.50 |
| VK6 | 3.75 | 0.50 | 2.00 | 2.75 | 4.55 | 86.45 |
| VK7 | 3.75 | 2.00 | 2.00 | 2.75 | 4.47 | 85.03 |
| VK8 | 3.75 | 1.00 | 4.00 | 2.75 | 4.43 | 84.07 |
| VK9 | 3.75 | 1.00 | 2.00 | 4.00 | 4.46 | 84.79 |
| VK10 | 3.75 | 1.00 | 2.00 | 7.00 | 4.31 | 81.94 |

Nitrogen oxide conversion assay as a measure of SCR activity: The NO conversions of the catalysts or comparative catalysts prepared according to the examples and comparative examples described above were determined in a quartz glass reactor. Drill cores with L=3" and D=1" were tested between 200 and 400° C. under steady-state conditions. Testing was carried out in a laboratory model gas system under the following conditions.

| Composition of the model gas | | |
|---|---|---|
| | Standard SCR Reaction | Fast SCR Reaction |
| $NO_x$ [vol. ppm]: | 1,000 | 1,000 |
| $NO_2/NO_x$ [%] | 0 | 75 |
| $NH_3$ [vol. ppm]: | 1,100 | 1,350 |
| $O_2$ [vol %]: | 10 | 10 |
| $H_2O$ [vol %] | 5 | 5 |
| $N_2$: | Remainder | Remainder |

| General test conditions | |
|---|---|
| Space velocity [$h^{-1}$]: | 60.000 |
| Temperature [° C.]: | 200; 250; 300; 350; 400 |
| Conditioning before beginning the measurement: | Model gas atmosphere; 550° C.; several minutes |

During the measurement, the nitrogen oxide concentrations of the model gas after flowing through the catalyst were recorded using a suitable analysis method. From the known, dosed nitrogen oxide contents that were verified during conditioning at the beginning of the respective test flow with a pre-catalyst exhaust gas analysis, and the nitrogen oxide conversion contents measured after flowing through the catalyst, the nitrogen oxide conversion, relative to the ratio of $NH_3$ to NO, over the catalyst was calculated for each temperature measuring point as follows:

$$U_{NO_x}[\%] = \left(1 - \frac{C_{output}(NO_x)}{C_{input}(NO_x)}\right) \times 100$$

with $$C_{input/output}(NO_x) = C_{input/output}(NO) + C_{input/output}(NO_2) + C_{input/output}(N_2O)$$

The resulting nitrogen oxide conversion values $U_{NO_x}$ [%] were plotted as a function of the temperature measured before to the catalyst, in order to evaluate the SCR activity of the investigated materials.

Table 2 shows the NOx conversion in the standard SCR reaction for the examples described above.

TABLE 2

| NOx Conversion in the Standard SCR Reaction | | | | | | | | | | |
|---|---|---|---|---|---|---|---|---|---|---|
| Nitrogen oxide conversion (%) in standard SCR reaction | | | | | | | | | | |
| | Fresh | | | | | After hydrothermal aging 48 h 700° C. | | | | |
| | 400° C. | 350° C. | 300° C. | 250° C. | 200° C. | 400° C. | 350° C. | 300° C. | 250° C. | 200° C. |
| K1 | 99.09 | 99.25 | 98.74 | 95.00 | 67.11 | 94.36 | 95.16 | 93.19 | 79.03 | 33.58 |
| VK1 | 98.42 | 98.39 | 96.85 | 87.75 | 47.47 | 0.41 | 3.41 | 2.77 | 1.84 | 0.85 |
| VK2 | 98.40 | 98.27 | 96.54 | 86.64 | 44.99 | 7.47 | 8.67 | 8.23 | 5.68 | 2.22 |
| VK3 | 99.08 | 99.28 | 98.80 | 95.36 | 68.97 | 9.69 | 13.86 | 11.05 | 6.15 | 2.17 |
| VK4 | 98.79 | 98.98 | 98.38 | 93.78 | 57.62 | 96.43 | 97.22 | 95.81 | 85.66 | 40.74 |
| VK5 | 99.11 | 99.32 | 98.65 | 93.51 | 57.88 | 4.60 | 6.32 | 6.35 | 4.85 | 2.31 |
| VK6 | 98.90 | 99.05 | 98.56 | 94.25 | 60.28 | 96.59 | 97.52 | 95.79 | 82.79 | 35.31 |
| VK7 | 99.29 | 99.48 | 99.05 | 96.17 | 71.64 | 94.82 | 95.71 | 92.05 | 70.23 | 26.41 |
| VK8 | 99.02 | 99.22 | 98.61 | 94.22 | 62.04 | 90.26 | 90.78 | 86.14 | 62.87 | 21.64 |
| VK9 | 99.23 | 99.43 | 99.06 | 95.56 | 67.52 | 93.76 | 94.33 | 91.63 | 75.27 | 29.59 |
| VK10 | 99.03 | 99.37 | 98.94 | 95.39 | 68.12 | 93.45 | 94.47 | 91.27 | 70.35 | 24.61 |

Figure 1:
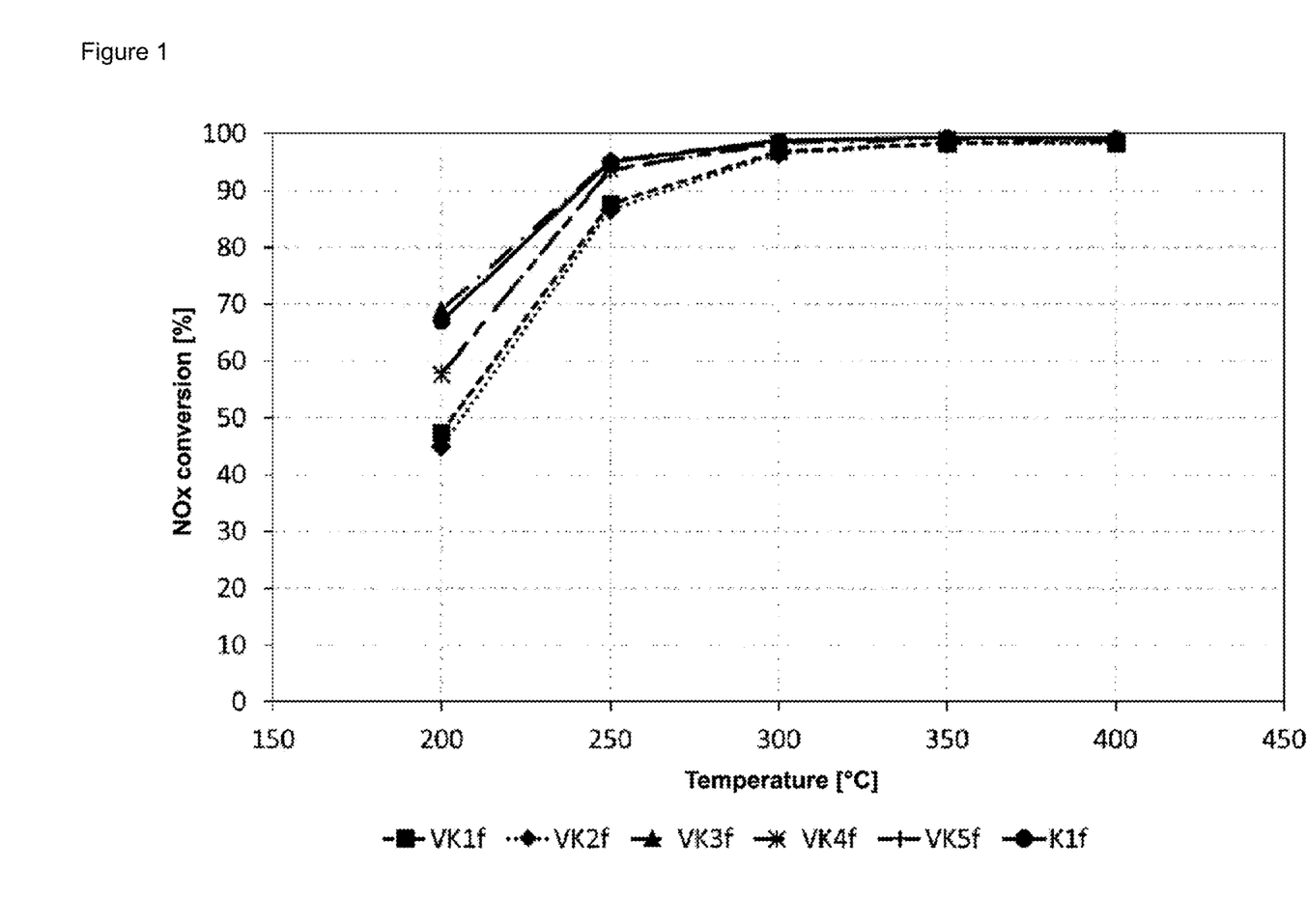
FIG. 1: Nitrogen oxide conversions in the standard SCR reaction, measured on the catalyst K1 according to the invention in comparison to comparative catalysts VK1, VK2 VK3, VK4, and VK5 in the fresh state (K1f, VK1f, VK2f, VK3f, VK4f, and VK5f).

The results of the standard SCR reaction of the fresh catalysts are shown in FIG. 1.

Figure 2:
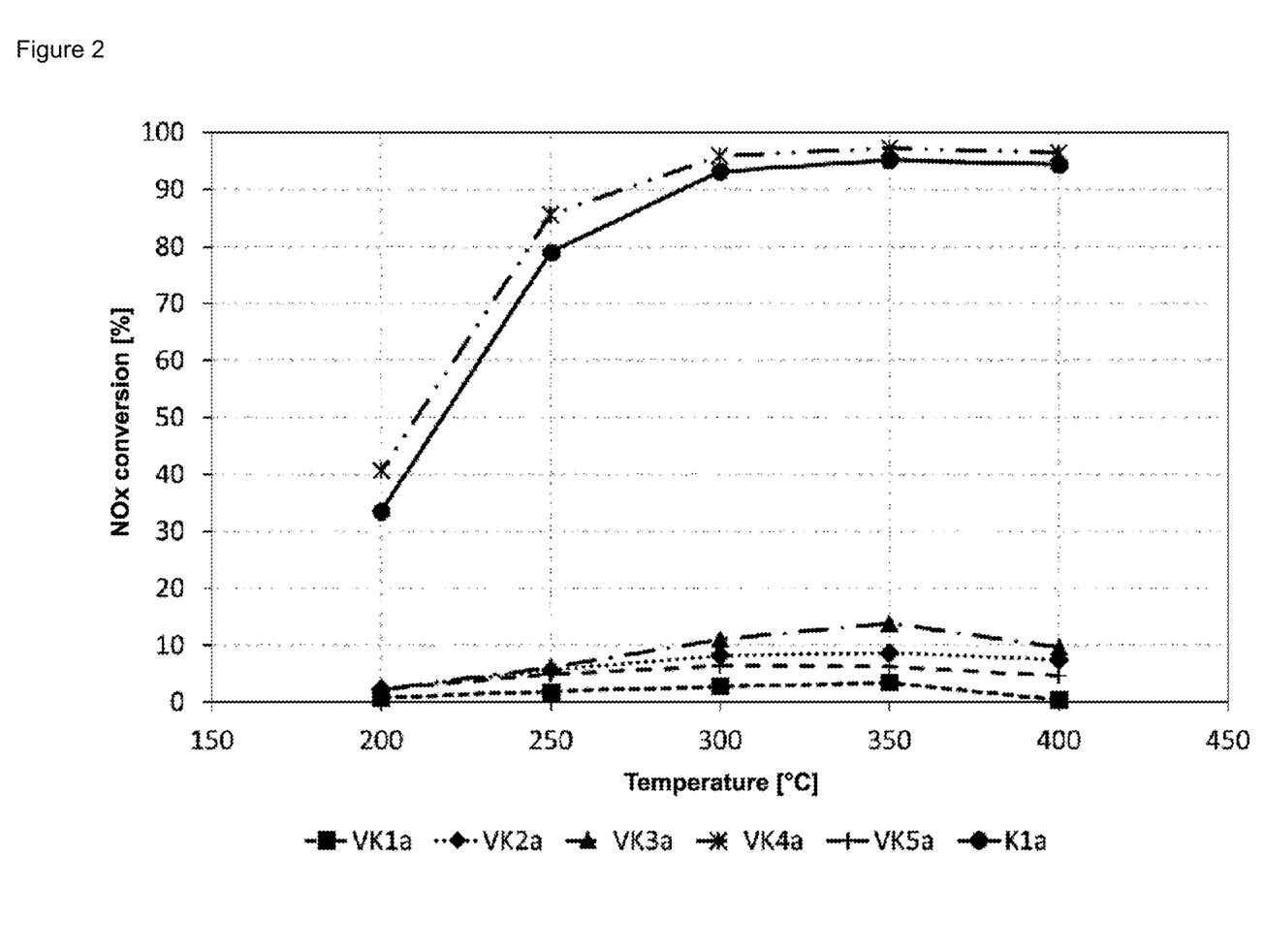
FIG. 2: Nitrogen oxide conversions in the standard SCR reaction, measured on the catalyst K1 according to the invention in comparison to comparative catalysts VK1, VK2, VK3, VK4, and VK5 in the aged state (K1a, VK1a, VK2a, VK3a, VK4a, and VK5a).

The results of the standard SCR reaction of the aged catalysts are shown in FIG. 2.

Table 3 shows the NOx conversion in the fast SCR reaction for the examples described above.

TABLE 3

| NOx Conversion in the Fast SCR Reaction | | | | | | | | | | |
|---|---|---|---|---|---|---|---|---|---|---|
| Nitrogen oxide conversion (%) in fast SCR reaction | | | | | | | | | | |
| | Fresh | | | | | After hydrothermal aging 48 h 700° C. | | | | |
| | 400° C. | 350° C. | 300° C. | 250° C. | 200° C. | 400° C. | 350° C. | 300° C. | 250° C. | 200° C. |
| K1 | 99.39 | 94.47 | 75.07 | 63.10 | 62.19 | 96.39 | 91.06 | 69.34 | 56.36 | 55.76 |
| VK1 | 97.60 | 80.80 | 61.14 | 56.95 | 51.08 | 18.41 | 22.47 | 22.35 | 19.95 | 12.24 |
| VK2 | 98.82 | 91.34 | 69.93 | 59.55 | 53.20 | 35.88 | 38.44 | 38.66 | 33.25 | 19.30 |
| VK3 | 97.52 | 86.89 | 65.80 | 61.71 | 61.98 | 33.83 | 34.88 | 33.57 | 29.34 | 18.68 |
| VK4 | 97.71 | 92.37 | 72.79 | 61.70 | 58.96 | 97.17 | 89.64 | 67.19 | 56.49 | 55.90 |
| VK5 | 99.80 | 98.30 | 82.93 | 62.98 | 61.10 | 27.79 | 33.76 | 36.58 | 33.48 | 22.16 |
| VK6 | 98.84 | 94.33 | 75.27 | 62.96 | 61.17 | 97.35 | 90.20 | 67.99 | 57.15 | 56.93 |
| VK7 | 98.53 | 95.40 | 77.87 | 63.56 | 63.67 | 97.90 | 91.97 | 69.69 | 56.97 | 56.52 |
| VK8 | 98.92 | 94.95 | 76.87 | 62.90 | 61.60 | 98.01 | 92.54 | 72.91 | 58.75 | 54.55 |
| VK9 | 98.91 | 93.84 | 74.01 | 62.22 | 61.97 | 95.35 | 89.70 | 68.65 | 56.07 | 55.03 |
| VK10 | 99.48 | 95.16 | 74.62 | 62.13 | 63.44 | 97.30 | 89.15 | 68.37 | 57.38 | 56.02 |

Figure 3:
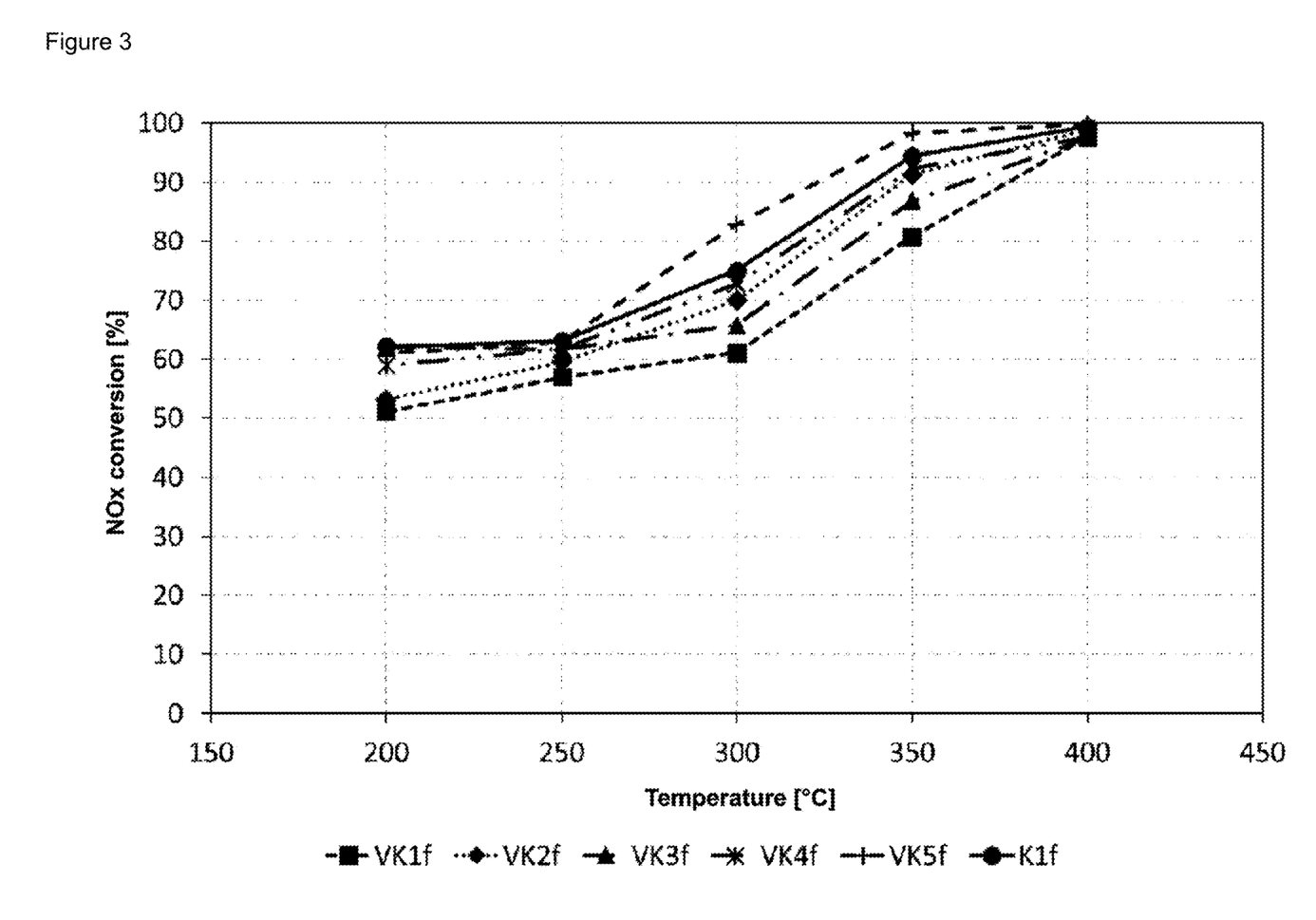
FIG. 3: Nitrogen oxide conversions in the fast SCR reaction, measured on the catalyst K1 according to the invention in comparison to comparative catalysts VK1, VK2, VK3, VK4, and VK5 in the fresh state (K1f, VK1f, VK2f, VK3f, VK4f, and VK5f).

The results of the fast SCR reaction of the fresh catalysts are shown in FIG. 3.

Figure 4:
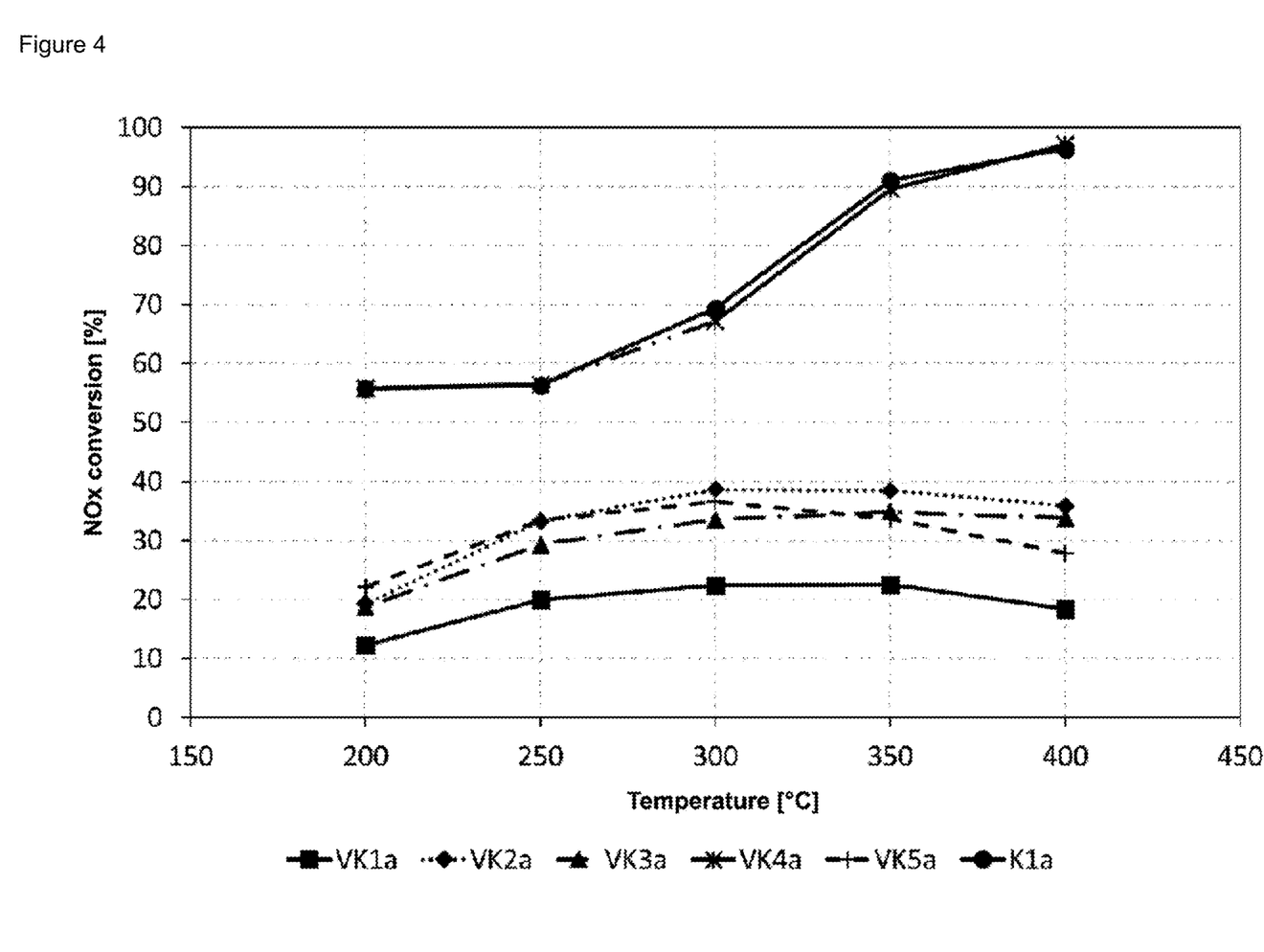
FIG. 4: Nitrogen oxide conversions in the fast SCR reaction, measured on the catalyst K1 according to the invention in comparison to comparative catalysts VK1, VK2, VK3, VK4, and VK5 in the aged state (K1a, VK1a, VK2a, VK3a, VK4a, and VK5a).

The results of the fast SCR reaction of the aged catalysts are shown in FIG. 4.

The influence of the WO$_3$ content of the catalyst on the NOx conversion in the standard SCR reaction at 200° C. and in the fast SCR reaction at 300° C. in the fresh and aged states is shown in Table 4. The quantities of V$_2$O$_5$, CeO$_2$, and Sb$_2$O$_5$ were kept constant at 3.75 wt %, 2.00 wt %, or 2.75 wt %, while the WO$_3$ content was varied from 0.00 wt % (VK4) to 0.50 wt % (VK6), 1.00 wt % (K1), and 2.00 wt % (VK7).

TABLE 4

Influence of the WO$_3$ Content on the NOx Conversion
Influence of the WO$_3$ content on the NOx conversion

| WO$_3$ content | In the standard SCR reaction at 200° C. | | In the fast SCR reaction at 300° C. | |
| --- | --- | --- | --- | --- |
| [wt %] | fresh | aged | fresh | aged |
| 0 | 57.6 | 40.7 | 72.8 | 67.2 |
| 0.5 | 60.3 | 35.3 | 75.3 | 68.0 |
| 1 | 67.1 | 33.6 | 75.1 | 69.3 |
| 2 | 71.6 | 26.4 | 77.9 | 69.7 |

Figure 5:
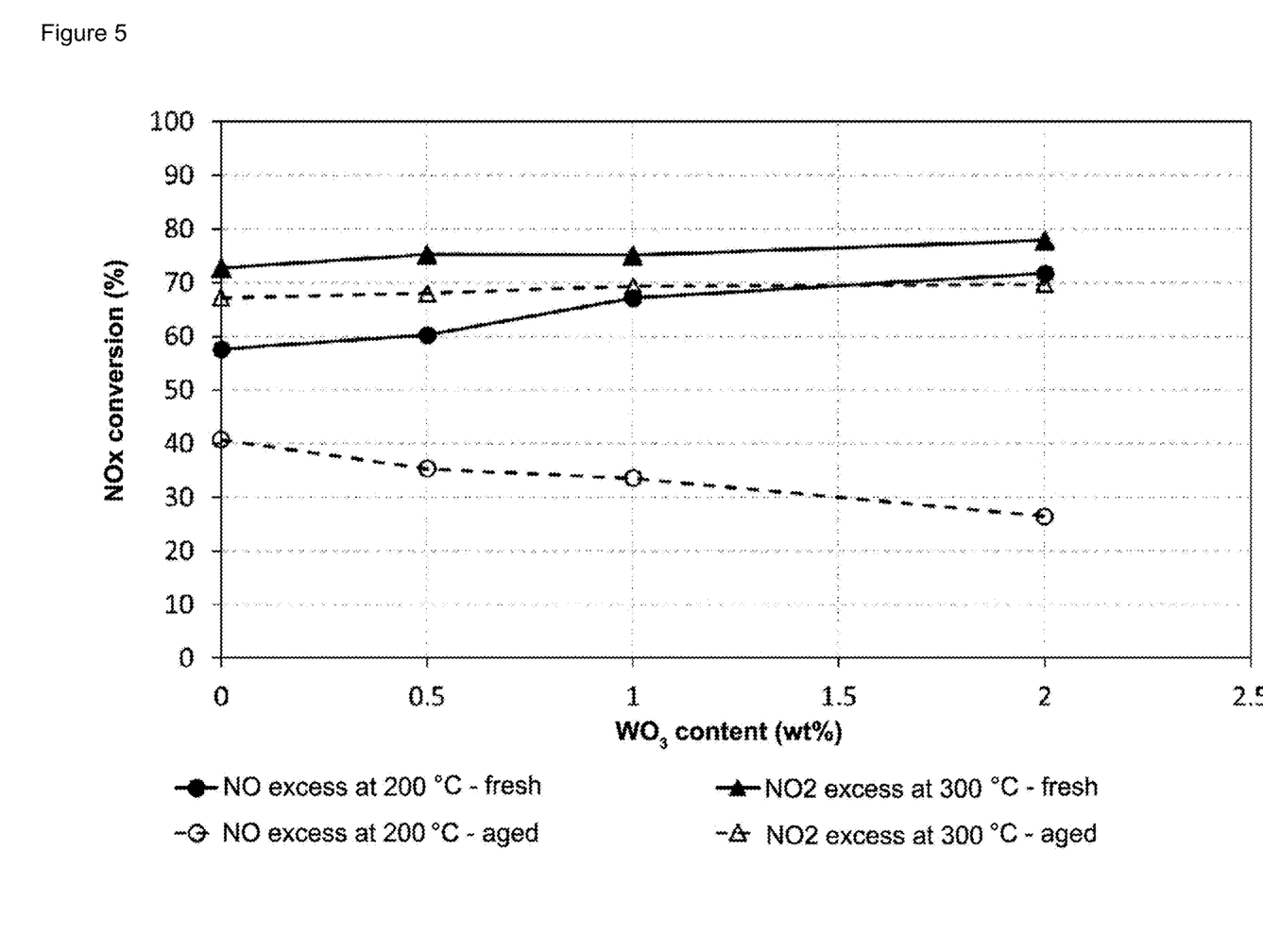
FIG. 5: Nitrogen oxide conversions in the standard SCR reaction at 200° C. and the fast SCR reaction at 300° C. versus the $WO_3$ content, measured on the catalyst K1 according to the invention in comparison to comparative catalysts VK4, VK6, and VK7 in the fresh and aged states.

The results of the influence of the WO$_3$ content are shown in FIG. 5.

The influence of the CeO$_2$ content of the catalyst on the NOx conversion in the standard SCR reaction at 200° C. and in the fast SCR reaction at 300° C. in the fresh and aged states is shown in Table 5. The quantities of V$_2$O$_5$, WO$_3$, and Sb$_2$O$_5$ were kept constant at 3.75 wt %, 1.00 wt %, or 2.75 wt %, while the CeO$_2$ content was varied from 0.00 wt % (VK3) to 2.00 wt % (K1) and 2.00 wt % (K7).

TABLE 5

Influence of CeO$_2$ Content on the NOx Conversion
Influence of Sb$_2$O$_5$ content on the NOx conversion

| CeO$_2$ content | In the standard SCR reaction at 200° C. | | In the fast SCR reaction at 300° C. | |
| --- | --- | --- | --- | --- |
| [wt %] | fresh | aged | fresh | aged |
| 0 | 69.0 | 2.2 | 65.8 | 33.6 |
| 2 | 67.1 | 33.6 | 75.1 | 69.3 |
| 4 | 62.0 | 21.6 | 76.9 | 72.9 |

Figure 6:
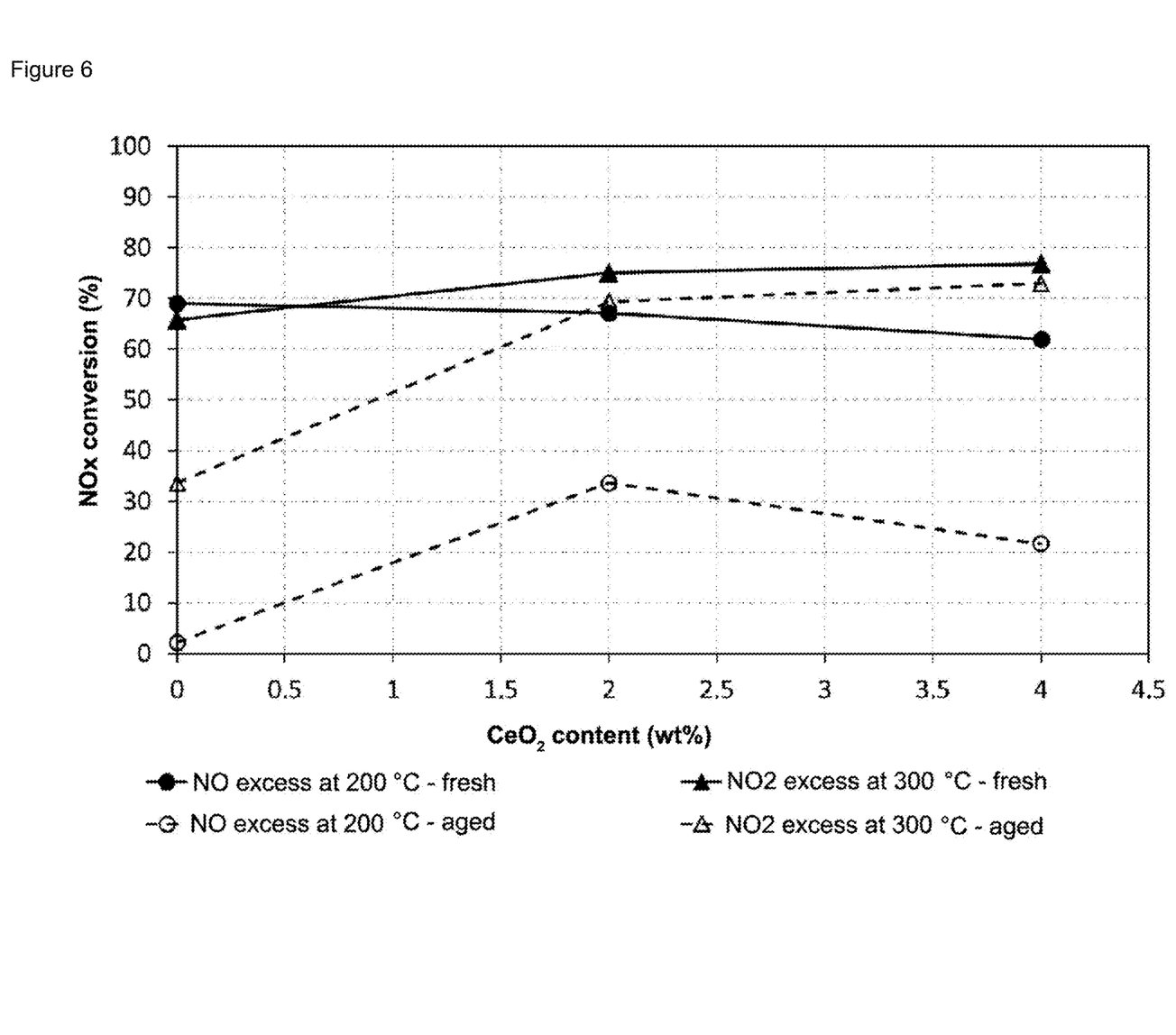
FIG. 6: Nitrogen oxide conversions in the standard SCR reaction at 200° C. and the fast SCR reaction at 300° C. versus $CeO_2$ content, measured on the catalyst K1 according to the invention in comparison to comparative catalysts VK3 and VK8 in the fresh and aged states.

The results of the influence of the CeO$_2$ content are shown in FIG. 6.

The influence of the Sb$_2$O$_5$ content of the catalyst on the NOx conversion in the standard SCR reaction at 200° C. and in the fast SCR reaction at 300° C. in the fresh and aged states is shown in Table 6. The quantities of V$_2$O$_5$, WO$_3$, and CeO$_2$ were kept constant at 3.75 wt %, 1.00 wt %, or 2.00 wt %, while the Sb$_2$O$_5$ content was varied from 0.00 wt % (VK2) to 2.75 wt % (K1), 4.00 wt % (VK9), and 7.00 wt % (VK10).

TABLE 6

Influence of Sb$_2$O$_5$ Content on the NOx Conversion
Influence of Sb$_2$O$_5$ content on the NOx conversion

| Sb$_2$O$_5$ content | In the standard SCR reaction, at 200° C. | | In the fast SCR reaction at 300° C. | |
| --- | --- | --- | --- | --- |
| [wt %] | fresh | aged | fresh | aged |
| 0 | 45.0 | 2.2 | 69.9 | 38.7 |
| 2.75 | 67.1 | 33.6 | 75.1 | 69.3 |
| 4 | 67.5 | 29.6 | 74.0 | 68.6 |
| 7 | 68.5 | 24.6 | 74.6 | 68.4 |

Figure 7:
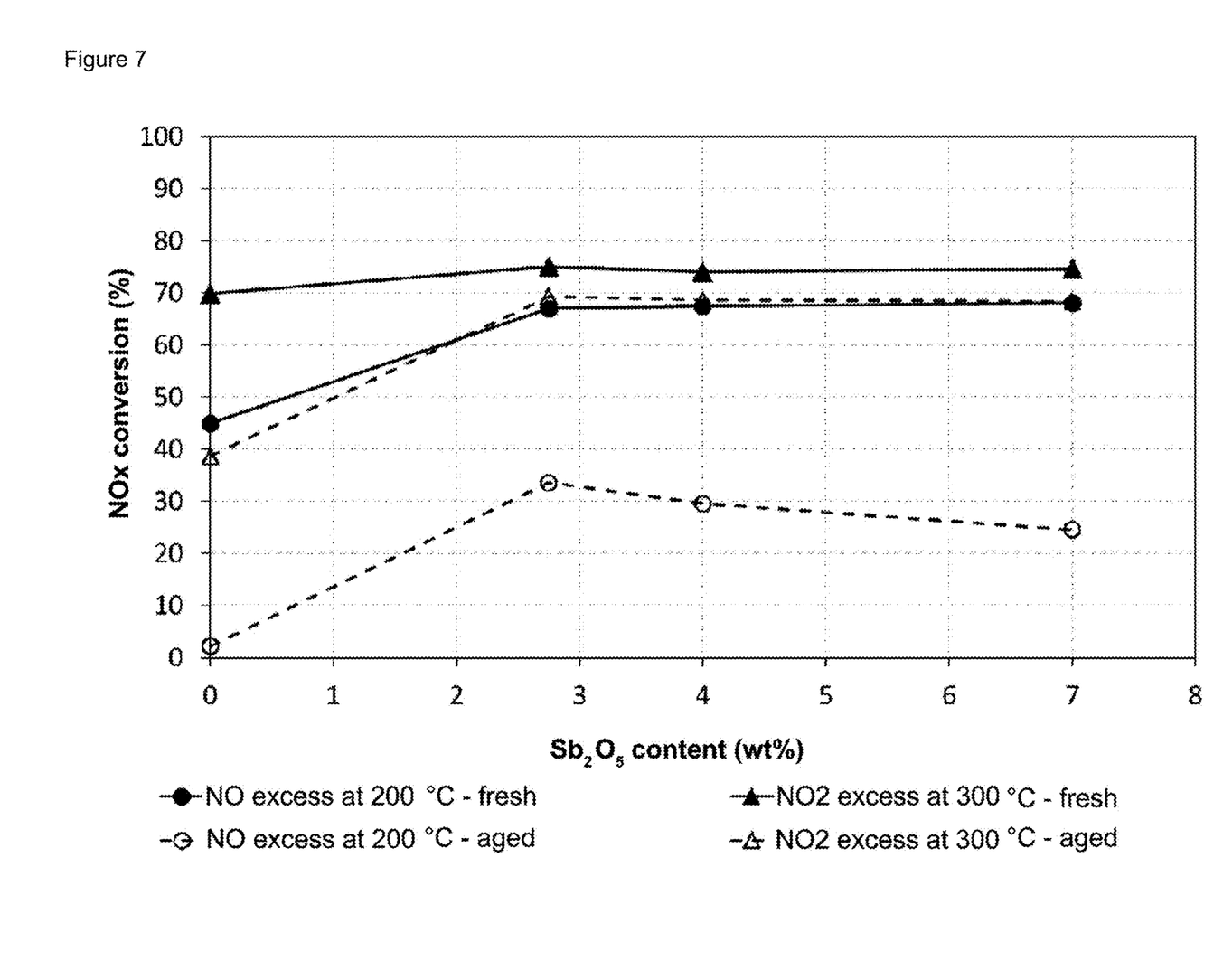
FIG. 7: Nitrogen oxide conversions in the standard SCR reaction at 200° C. and the fast SCR reaction at 300° C. versus $Sb_2O_5$ content, measured on the catalyst K1 according to the invention in comparison to comparative catalysts VK2, VK9, and VK10 in the fresh and aged states.

The results of the influence of the Sb$_2$O$_5$ content are shown in FIG. 7.

The invention claimed is:

1. A method of making a catalyst having at least one oxide of vanadium in an amount of 2 to 6 wt %, at least one oxide of tungsten in an amount of 0.5 to 2 wt %, at least one oxide of cerium in an amount of 2 to 4 wt %, at least one oxide of antimony in an amount of 1 to 7 wt %, at least one oxide of silicon in an amount of 0 wt % or 2 to 7 wt %, and at least one oxide of titanium in an amount is measured so as to result in a total of 100 wt %, in each case based on the total weight of the catalyst and calculated as V$_2$O$_5$, WO$_3$, CeO$_2$, Sb$_2$O$_5$, TiO$_2$, or, if the at least one oxide of silicon is present, SiO$_2$, said method comprising:
 obtaining oxides of vanadium, tungsten, cerium, antimony, titanium, and, if present, silicon,
 forming a mixture of the oxides, and
 calcining the mixture.

2. The method of claim 1, wherein the oxides are provided in powder form.

3. The method of claim 1, wherein the mixture is a slurry of the oxides in water, and the method further comprises drying the slurry before calcining.

4. The method of claim 1, wherein a portion of the oxides are provided in the mixture in the form of an aqueous solution.

5. The method of claim 1, wherein the mixture comprises oxides of tungsten, cerium, antimony, and titanium that have been impregnated with a vanadium oxide.

6. The method of claim 1, wherein the mixture comprises oxides of vanadium, cerium, antimony, and titanium that have been impregnated with an oxide of tungsten.

7. The method of claim 1, wherein at least two oxides in the mixture are provided as one oxide doped with the other oxide.

8. The method of claim 1, wherein two or more oxides are provided in the mixture as a mixed oxide.

9. The method of claim 1, wherein the mixture comprises a titanium dioxide doped with silicon dioxide and tungsten trioxide, and impregnated with oxides of vanadium and antimony.

10. The method of claim 1, wherein the mixture contains at least one oxide of silicon.

11. The method of claim 1, wherein the mixture further comprises at least one oxide of molybdenum, niobium, zirconium, tantalum, and/or hafnium.

12. The method of claim 11, wherein the amount of the at least one oxide of molybdenum, niobium, zirconium, tantalum, and/or hafnium is 0.5 to 20 wt % based on the total weight of the mixture and calculated as MoO$_3$, Nb$_2$O$_5$, ZrO$_2$, Ta$_2$O$_5$, or HfO$_2$.

13. The method of claim 1, which comprises forming the mixture by dispersing titanium dioxide doped with 5 wt % silicon dioxide in water, and adding vanadium dioxide, tungsten trioxide, cerium dioxide, and antimony pentoxide thereto.

14. The method of claim 13, wherein the added amounts of vanadium dioxide, tungsten trioxide, cerium dioxide, and antimony pentoxide result in a catalyst composition comprising 86.00 wt % $TiO_2$, 4.50 wt % $SiO_2$, 3.75 wt % $V_2O_5$, 1.00 wt % $WO_3$, 2.00 wt % $CeO_2$, and 2.75 wt % $Sb_2O_5$.

* * * * *